US007929852B1

(12) United States Patent
Pace et al.

(10) Patent No.: US 7,929,852 B1
(45) Date of Patent: Apr. 19, 2011

(54) INTEGRATED 2D/3D CAMERA

(76) Inventors: Vincent Pace, Shadow Hills, CA (US); Patrick Campbell, Stevenson Ranch, CA (US)

( * ) Notice: Subject to any disclaimer, the term of this patent is extended or adjusted under 35 U.S.C. 154(b) by 0 days.

(21) Appl. No.: 12/578,171

(22) Filed: Oct. 13, 2009

(51) Int. Cl.
*G03B 3/00* (2006.01)
(52) U.S. Cl. ........................................................ 396/89
(58) Field of Classification Search .................. 396/89
See application file for complete search history.

(56) References Cited

U.S. PATENT DOCUMENTS

| 5,465,128 | A * | 11/1995 | Wah Lo et al. ................ 396/326 |
| 5,699,108 | A * | 12/1997 | Katayama et al. .............. 348/47 |
| 5,737,655 | A * | 4/1998 | Inaba ............................ 396/324 |
| 5,801,760 | A * | 9/1998 | Uomori .......................... 348/47 |
| 5,974,272 | A * | 10/1999 | Kiesow et al. ................ 396/140 |
| 5,978,015 | A * | 11/1999 | Ishibashi et al. ............... 348/47 |
| 6,160,607 | A * | 12/2000 | Diaconu ........................ 352/140 |
| 6,388,666 | B1 | 5/2002 | Murray |
| 6,512,892 | B1 * | 1/2003 | Montgomery et al. ....... 396/326 |
| 6,701,081 | B1 * | 3/2004 | Dwyer et al. ................. 396/329 |
| 6,909,457 | B1 | 6/2005 | Fukasawa |
| 7,031,512 | B2 | 4/2006 | Ng |
| 7,218,342 | B2 | 5/2007 | Kobayashi et al. |
| 7,551,272 | B2 * | 6/2009 | Vodanovic ................. 356/237.1 |
| 2001/0056477 | A1 | 12/2001 | McTernan et al. |
| 2002/0012043 | A1 | 1/2002 | Guerin et al. |
| 2007/0103675 | A1 * | 5/2007 | Vodanovic ................. 356/237.1 |
| 2007/0247614 | A1 * | 10/2007 | Puah et al. ...................... 356/73 |
| 2008/0007567 | A1 | 1/2008 | Clatworthy et al. |
| 2008/0123938 | A1 | 5/2008 | Kim |
| 2009/0060273 | A1 | 3/2009 | Stephen et al. |
| 2009/0262184 | A1 | 10/2009 | Engle et al. |

OTHER PUBLICATIONS

21st Century3d.com, "21st Century 3D Introduces Uncompressed 4:4:4 Stereoscopic Camera System—3DVX3", SPIE Stereoscopic Displays and Applications Conference; avail. Http://www.21stcentury3d.com/press/pr-060117-3dvx3.html; printed Sep. 11, 2008, 3 pages.
FullCamera.com, "21st Century 3D Introduces New Digital Steroscopic Motion Picture Camera System", http://fullcamera.com/article/cfm/id/281457, printed Sep. 11, 2008, 2 pages.
Hurwitz, Matt, "Dreaming in 3D", CineGear Expo News, The Official CineGear Expo Show Newspaper, Jun. 3-5, 2005, pp. 23-24.
World Intellectual Property Organization, International Search Report and Written Opinion for International Application No. PCT/US2010/059321, Mail Date Feb. 11, 2011.

(Continued)

*Primary Examiner* — Rodney E Fuller
(74) *Attorney, Agent, or Firm* — SoCal IP Law Group LLP; Steven C. Sereboff; John E. Gunther (57) ABSTRACT

An integrated 2D/3D camera system may include a 2D camera and a 3D camera affixed to the 2D camera. The 2D camera may include a first lens that is lens adjustable to set a 2D focus distance. The 3D camera may include a left camera and a right camera including respective left and right lenses, the left and right lenses synchronously adjustable to set a 3D focus distance. A focus mechanism may automatically set the 2D focus distance and the 3D focus distance to be essentially equal by one of adjusting the first lens based on the 3D focus distance and synchronously adjusting the left and right lenses based on the 2D focus distance.

15 Claims, 7 Drawing Sheets

OTHER PUBLICATIONS

Jeong et al., A Study on the Flexible Camera Calibration Method Using a Grid Type Frame with Different Line Widths, Aug. 2-5, 2002, SICE 2002, Proceedings of the 41st SICE Annual Conference, Date Aug. 5-7, 2002, vol. 2, accessed Jan. 28, 2011, http://ieeexplorer.ieee.org/xpl/freeabs_all.jsp?amumber=1195380, pp. 1319-1324.

Chen et al., An Efficient Approach for the Calibration of Multiple PTZ Cameras, Apr. 2007, IEEE transactions on automation science and engineering, vol. 4, No. 2, Apr. 2007, accessed on Jan. 28, 2011, http://ieeexplorer.ieee.org/search/freesearchabstract.jsp?tp=&arnumber=4147544& queryText%3DAn+Efficient+Approach+for+the+Calibartion+ of+Multiple+PTZ+Cameras%26openedRefinements%3D*%26searchField%3DSearch+All.

World Intellectual Property Organization, International Search Report and Written Opinion for International Application No. PCT/US10/52025, mail date Nov. 19, 2010, pp. 1-5.

* cited by examiner

INTEGRATED 2D/3D CAMERA

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to stereoscopy.

2. Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the fields of view of each of our eyes overlap, with each eye perceiving a slightly different perspective of the same area. As we focus on objects closer to our eyes, our eyes rotate towards each other. As we focus on distant objects, our eyes rotate towards a parallel view. The angle between the lines of sight of each eye is commonly termed the convergence angle. The convergence angle is higher when we view objects closer to our eyes and lower when viewing distance object. The convergence angle may be essentially zero, indicating essentially parallel lines of sight, when we view objects at great distance.

Three dimensional (3D) imaging, also known as stereographic imaging, dates at least as far back as 1838. Historically, stereographic cameras commonly include two lenses spaced laterally apart a similar distance as an average human's eyes, approximately 65 mm. The effective distance of the lenses from each other is known as the interocular distance. The interocular distance has a strong effect on the apparent depth of a stereographic image. Increasing the interocular spacing increases the apparent depth of a stereographic image. Decreasing the interocular spacing has the effect of decreasing the apparent depth of a stereographic image.

The presentation of stereoscopic images is commonly achieved by providing a first image to be seen only by the left eye and a second image to be seen only by the right eye. Differences, or disparity, between the two images may provide an illusion of depth. Two images having disparity may be perceived as three-dimensional. Two images, or portions of two images, exhibiting excessive disparity may not be perceived as three-dimensional, but may simply be seen as two overlapping two-dimensional images. A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of the second polarization state. Stereoscopic displays of this type typically project the two polarized images onto a common projection screen. This technique has been used to present 3D movies.

A second approach to displaying stereographic images is to form the left-eye and right-eye images alternately on a common viewing screen at a high rate. The images may then be viewed using shutter glasses that alternately occult either the right or left eye in synchronism with the alternating images.

Throughout this description, elements appearing in schematic views and block diagrams are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits. Elements that have similar functions for either the left or right eyes are assigned the same reference designator with a suffix of either "L" or "R" to indicate left-eye or right-eye, respectively.

DETAILED DESCRIPTION

Description of Apparatus

Figure 1:
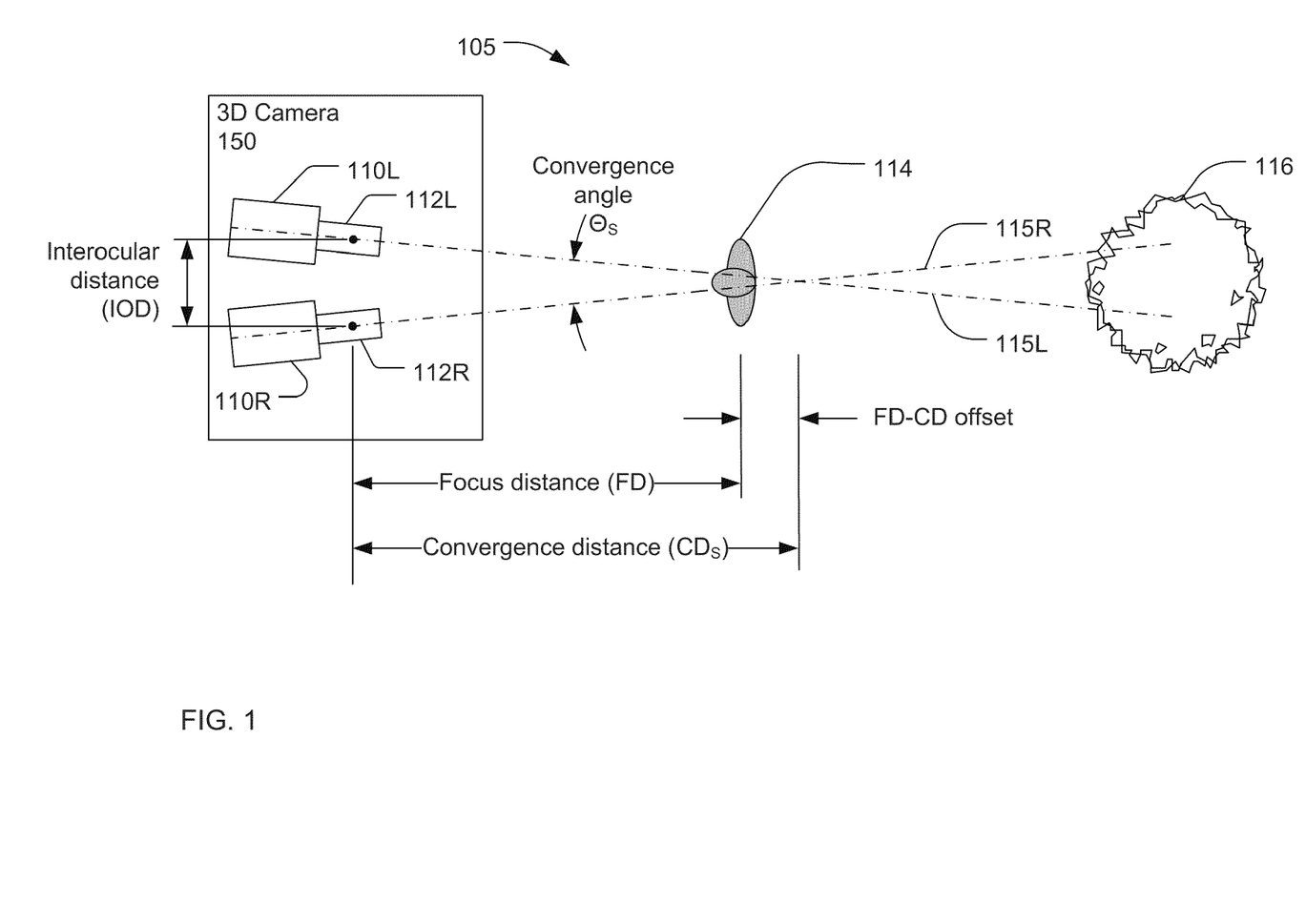
FIG. 1 is a schematic view of a stereographic camera in an environment.

Referring now to FIG. 1, a 3D, or stereographic, camera 150 may include a left camera 110L and a right camera 110R. The term "camera" is intended to include any device having an optical system to form an image of an object and a medium to receive and detect and/or record the image. The left and right cameras may be film or digital still image cameras, may be film or digital motion picture cameras, or may be video cameras. Each of the left and right cameras 110L, 110R may include a lens 112L, 112R. The term "lens" is intended to include any image-forming optical system and is not limited to combinations of transparent refractive optical elements. A lens may use refractive, diffractive, and/or reflective optical elements and combinations thereof. Each lens may have an axis 115L, 115R that defines the center of the field of view of each camera 110L, 110R.

The left and right cameras 110L, 110R may be separated by an interocular distance IOD. The cameras 110L, 110R may be disposed such that the axis 115L, 115R are parallel or such that a stereo convergence angle $\Theta_S$ is formed between the two axis 115L, 115R. The cameras 110L, 110R may be disposed such that the axis 115L, 115R cross at a stereo convergence distance $CD_S$ from the cameras. The interocular distance IOD, the stereo convergence distance $CD_S$, and the stereo convergence angle $\Theta_S$ are related by the formula $$\Theta_S = 2A\ TAN(IOD/2CD_S), \text{ or} \quad (1)$$

$$CD_S = IOD/[2\ TAN(\Theta_S/2)]. \quad (2)$$

The interocular distance IOD and the stereo convergence distance $CD_S$ may be measured from a nodal point within the lenses 112L, 112R, which may be the center of an entrance pupil of each lens 112L, 112R.

The stereographic camera 150 may be used to form a stereographic image of a scene 105. As shown in the simplified example of FIG. 1, the scene 105 may include a primary subject 114, which is shown, for example, as a person. The scene 105 may also include other features and objects in the background (behind the primary subject 114) or the foreground (between the camera and the primary subject 114). When the images from a stereographic camera, such as the 3D camera 150, are displayed on a viewing screen, scene objects at the convergence distance will appear to be in the plane of the viewing screen. Scene objects, such as the primary subject 114 in the example of FIG. 1, located closer to the stereographic camera may appear to be in front of the viewing screen. Scene objects, such as the tree 116, located further from the stereographic camera may appear to be behind the viewing screen.

Each lens 112L, 112R may have adjustable focus. The lenses 112L, 112R may be focused at a common adjustable focus distance FD. The focus distance FD may be adjusted manually or may be automatically adjusted. The focus distance FD may be adjusted such that the cameras 110L, 110R are focused on the primary subject 114. The focus distance may be automatically adjusted in response to a sensor (not shown) that determines the distance from the cameras 110L, 110R to the primary subject 114. The sensor to determine the distance from the cameras to the primary subject 114 may be an acoustic range finder, an optical or laser range finder, or some other distance measuring device. In the case where the cameras 110L, 110R are digital still image, motion picture, or video cameras, the focus distance may be adjusted in response to one or more processors (not shown) that analyze one or both of the images sensed by the cameras. The processors may be located within or may be coupled to the cameras.

The convergence distance CD and the focus distance FD may commonly be set to the same distance, which may be the distance from the cameras 110L, 110R to the primary subject 114. However, as shown in FIG. 1, the convergence distance CD and the focus distance FD may not be the same distance. For example, the focus distance FD may be set at the distance from the cameras to the primary subject and the convergence distance CD may be set slightly longer than the focus distance. In this case, when the images are displayed, the primary subject will be seen to be in front of the plane of the viewing screen.

Each lens 112L, 112R may also have zoom capability, which is to say that the focal length FL of each lens may be adjusted. The focal lengths of the lenses 112L, 112R may be adjusted manually or automatically. The focal lengths of the lenses 112L, 112R may be adjusted synchronously such that focal lengths of the lenses are precisely the same at all times. The focal lengths of the lenses 112L, 112R may be adjustable over a predetermined continuous range of focal lengths.

Figure 2:
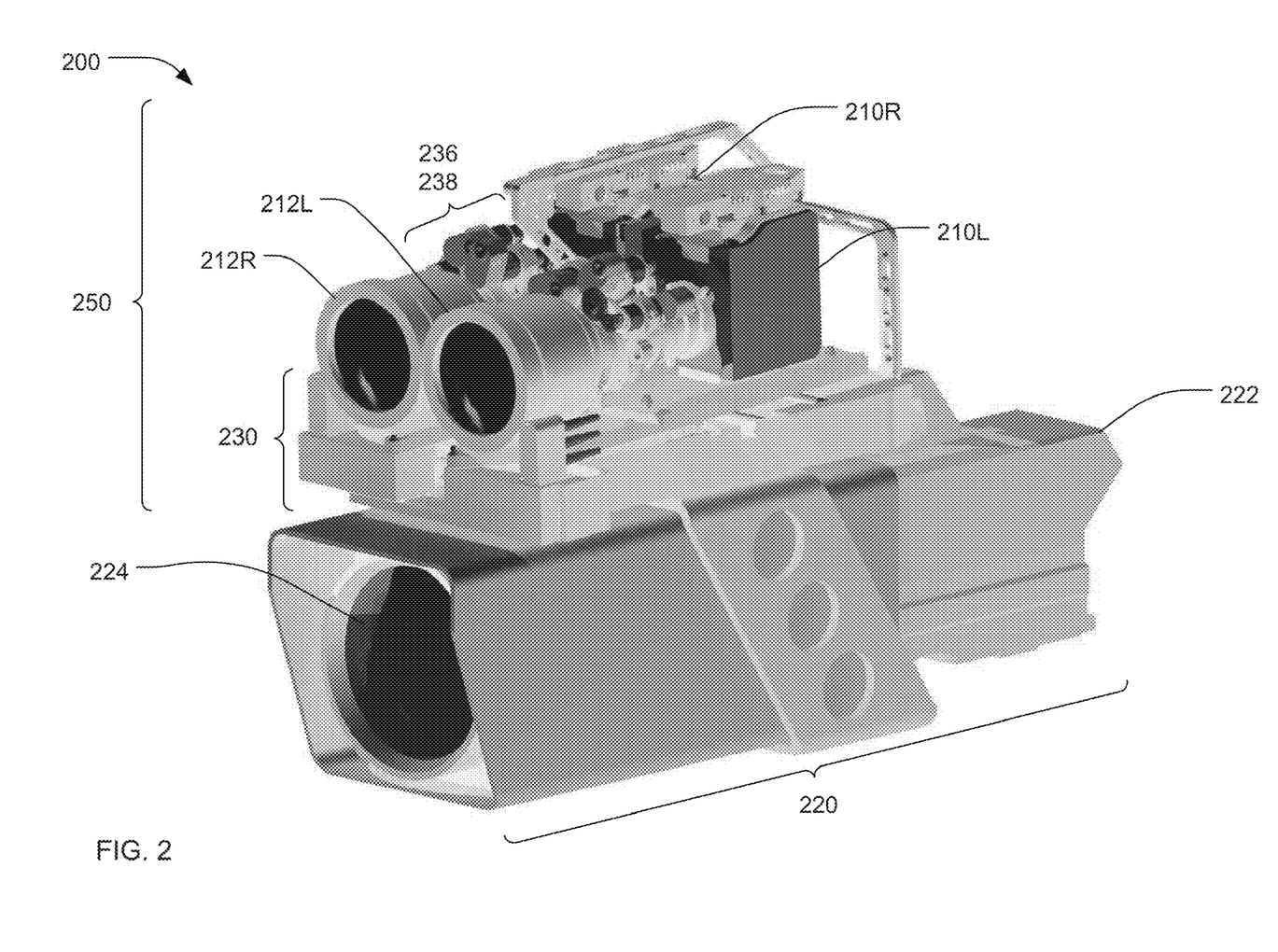
FIG. 2 is a perspective view of an exemplary integrated 2D/3D camera.

Referring now to FIG. 2, an integrated 2D/3D camera system may include a 3D camera 250 affixed, or attached physically, to a 2D camera 220. The 3D camera 250 may include left and right cameras 210L, 210R, each of which may have an associated lens 212L, 212R.

The left and right cameras 210L 210R may be supported by a motion platform 230. The motion platform 230 may provide for adjustment of an interocular distance and a stereo convergence angle between the left and right cameras 210L, 210R. The motion platform 230 may provide for adjustment of a line of sight of the 3D camera 250 with respect to a line of sight of the 2D camera 220.

The 3D camera 250 may include a focus mechanism 236 and a zoom mechanism 238 to control a focus distance and a focal length, respectively, of the left and right lenses 212L, 212R.

In this patent, the term "mechanism" refers to a combination of mechanical, electrical, and electromechanical components, including at least one component movable with respect to other components, and an actuator which causes relative motion of the movable component. The relative motion may be linear, angular, a combination or linear and angular, or some other movement. The movable components may be coupled by rotary or linear slides, bearings, bushings, or other devices. The actuator may be a motor or a manually operated lever, knob, crank, ring, or other device. The actuator may be all or a portion of one of the movable components, or may be coupled to the movable components by way of one or more gears, belts, links, and other devices. Examples of mechanisms include motorized linear or rotational motion stages and manual or motorized systems currently used to adjust focus and aperture on cinematic camera lenses.

The 2D camera 220 may include a camera head 222 and a lens 224. The 2D camera may also include a focus mechanism and a zoom mechanism, not visible in FIG. 2, to control a focus distance and a focal length, respectively, of the lens 224.

Figure 3:
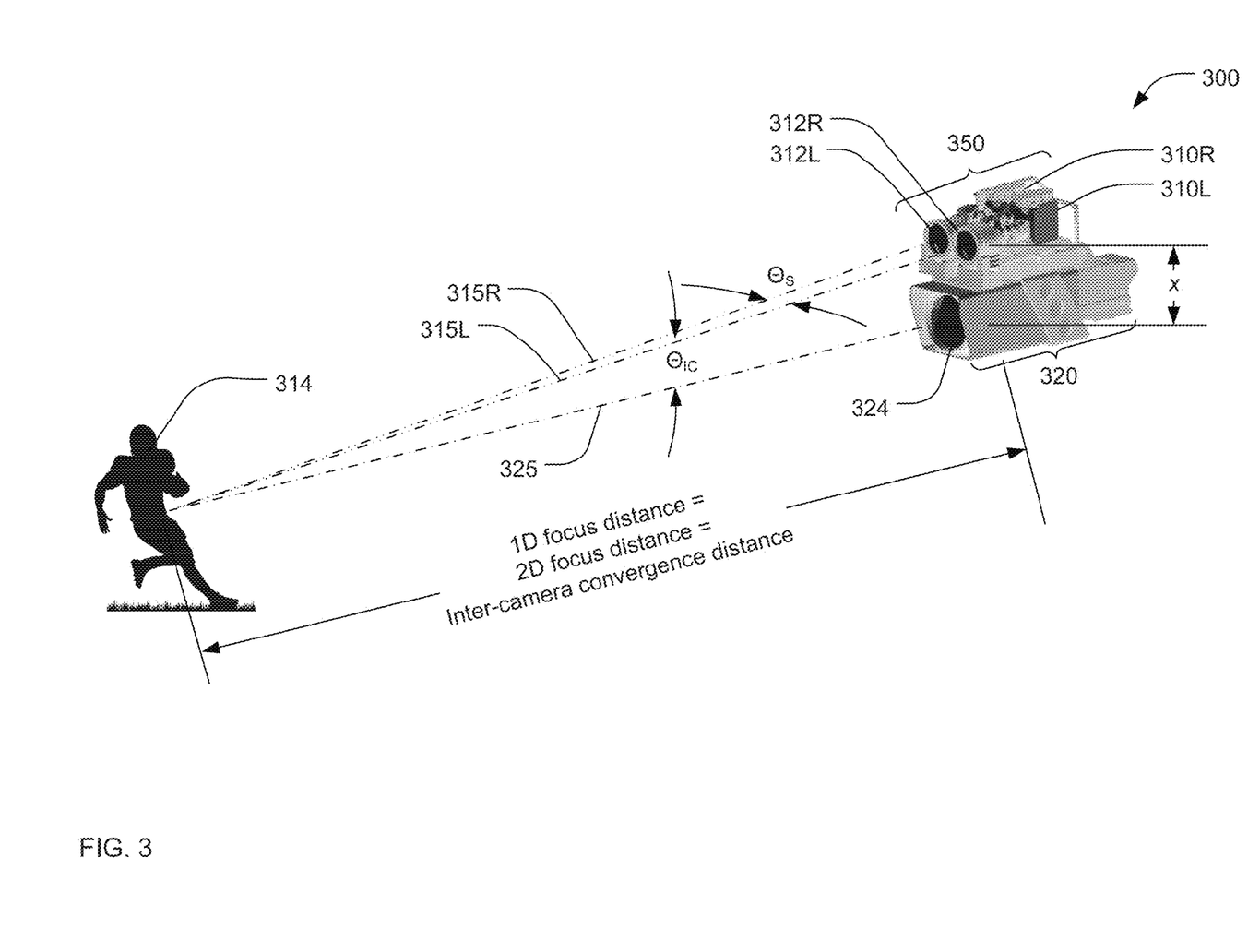
FIG. 3 is a schematic perspective view of an integrated 2D/3D camera in an environment.

Referring now to FIG. 3, an integrated 2D/3D camera 300, which may be the integrated 2D/3D camera 200, may be used to record an image of a scene including a primary subject 314. The integrated 2D/3D camera 300 may include a 2D camera 320 coupled to a 3D, or stereographic, camera 350. The 2D camera may include a first lens 324 having an optical axis 325 which may define the center of an image captured of the 2D camera 320. The 3D camera 350 may include let and right cameras 310L, 310R having respective left and right lenses 312L, 312R. The left and right lenses 312L, 312R may have respective axes 315L, 315R which define the centers of images captured by the left and right cameras 312L, 312R.

To record an image of the primary subject 314, the 2D camera 320 may be aimed such that the axis 325 is centered on the primary subject 314. Further, the lens 324 may be focused on the primary subject 314, which is to say that a focus distance of the lens 324 may be set to equal a distance between the 2D camera 320 and the primary subject 314. Throughout this description, the term "equal" should be interpreted as "essentially equal" or equal to within a tolerance that does not visibly degrade the images being recorded. For example, the focus distance of the lens 324 may be set to equal the distance between the 2D camera 320 and the primary subject 314 to with a tolerance that is very small compared to a depth of focus of the lens 324.

Similarly, to record an image of the primary subject 314, the 3D camera 350 may be aimed such that the axes 315L, 315R converge at or near the center of the primary subject 314. Further, the lenses 312L, 312R may be focused on the primary subject 314, which is to say that a focus distance of the lenses 312L, 312R may be set to equal a distance between the 3D camera 350 and the primary subject 314.

The 2D camera 320 and the 3D camera 350 may be separated by an inter-camera distance X. The 2D camera 320 and the 3D camera 350 may be disposed such that the axes 325 and 315L/R are parallel or such that an inter-camera convergence angle $\Theta_{IC}$ is formed between the axes 325 and 315L/R, where the notation 315L/R indicates a bisector of the axes 315L, 315R. The 2D camera 320 and the 3D camera 350 may be disposed such that the axes 325 and 315L/R cross at an inter-camera convergence distance $CD_{IC}$ from the cameras. The inter-camera distance X, the inter-camera convergence distance $CD_{IC}$, and the inter-camera convergence angle $\Theta_{IC}$ are related by the formula $$\Theta_{IC}=2A\ TAN(X/2CD_{IC}), \text{ or} \quad (3)$$

$$CD_{IC}=X/[2\ TAN(\Theta_{IC}/2)]. \quad (4)$$

In the examples of FIG. 3, the 3D camera 350 and the 2D camera 320 are shown to be vertically displaced by the inter-camera distance X. An integrated 2D/3D camera may include a 2D camera and a 3D camera that are horizontally adjacent, or displaced in some other direction.

The lens 324 of the 2D camera 320 may have zoom capability, which is to say that the focal length of the lens 324 may be adjusted. The lenses 312L, 312R of the 3D camera 350 may also have zoom capability and the focal lengths of the lenses 312L, 312R may be synchronously adjustable. The images sensor within the 2D camera head 322 and the 3D cameras 310L, 310R may not be of the same size, which implies that the 2D camera lenses 324 and the 3D camera lenses 312L, 312R may need to have different focal lengths to provide the same image field of view. Further, a tight framing (in which the primary subject 314 fills a large portion of the image) may typically be used for the 2D camera and a wider framing may typically be used to emphasize the depth captured by the 3D camera. Thus the focal lengths of the 2D lens 324 and the 3D lenses 312L, 312R may be set proportionally.

When the integrated 2D/3D camera 300 is used to record an image, the following relationships may hold:

$$FD_{2D}=FD_{3D}=CD_{IC}\approx CD_{S} \quad (5)$$

$$FL_{3D}=k(FL_{2D}) \quad (6)$$

where $FD_{2D}$ and $FD_{3D}$ are the focus distance of the 2D camera lens 324 and the 3D camera lenses 312L, 312R, respectively; $FL_{2D}$ and $FL_{3D}$ are the focal lengths of the 2D camera lens 324 and the 3D camera lenses 312L, 312R, respectively; and k is a proportionality constant.

Figure 4:
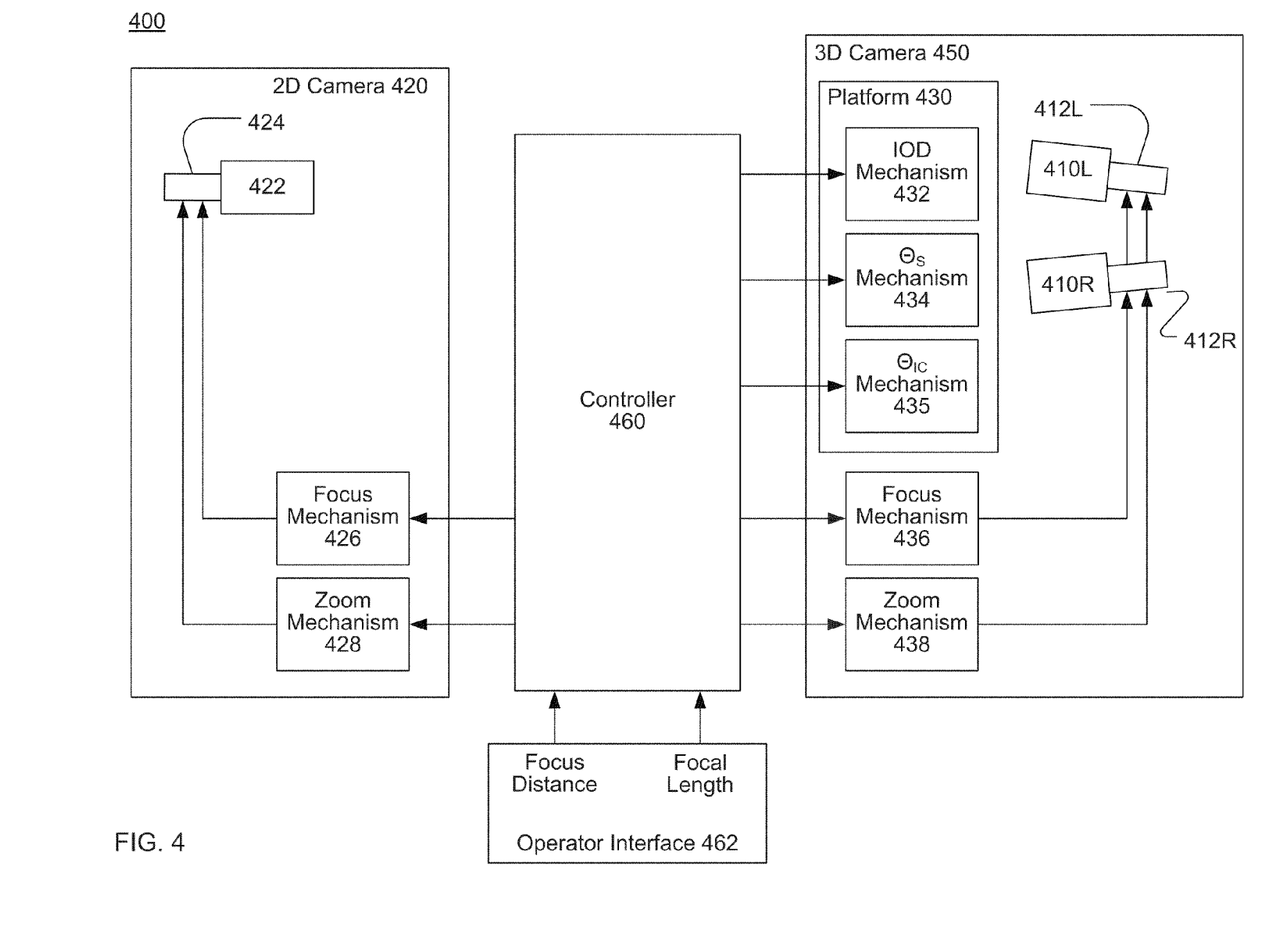
FIG. 4 is a block diagram of an integrated 2D/3D camera.

Referring now to FIG. 4, an integrated 2D/3D camera system 400, which may be the integrated 2D/3D camera system 200, may include a 2D camera 420 and a 3D camera 450 coupled to a controller 460. The 2D camera may include a camera head 422 and a lens 424. The 3D camera 450 may include a left camera 410L and a right camera 410R, each of which has an associated lens 412L, 412R.

The 2D camera 420 may include a focus mechanism 426 and a zoom mechanism 428 for setting a focus distance and a focal length, respectively, of the lens 424. The focus mechanism 426 and the zoom mechanism 428 may include motors or other actuators adapted to set the focus distance and focal length, respectively, in response to data received from the controller 460. The focus mechanism 426 and the zoom mechanism 428 may be manually controlled by an operator such as a cameraman or assistant cameraman (commonly called a "focus puller"). When manually controlled, the focus mechanism 426 and the zoom mechanism 428 may include encoders, potentiometers, or other sensors to provide data indicating the focus distance and focal length, respectively, to the controller 460. The focus mechanism 426 and the zoom mechanism 428 may be adapted to operate under manual control and/or in response to data received from the controller 460.

The 3D camera 450 may include a motion platform 430 with a plurality of mechanisms to adjust the position and/or orientation of the left and right cameras 410L, 410R. The 3D camera 450 may also include a focus mechanism 436 and a zoom mechanism 438 to synchronously adjust a focus distance and a focal length, respectively, of the left and right lenses 412L, 412R.

The motion platform 430 may include an IOD mechanism 432 to adjust an interocular distance between the left camera 410L and the right camera 410R. The motion platform 430 may include a $\Theta_S$ mechanism 434 to adjust a stereo convergence angle between the left camera 410L and the right camera 410R by pivoting one or both cameras about respective pivot axes. The IOD mechanism 432, and the $\Theta_S$ mechanism 434 may include one or more movable platforms or stages coupled to motors or other actuators. The IOD mechanism 432 and the $\Theta_S$ mechanism 434 may be adapted to set the interocular distance and the stereo convergence angle, respectively, in response to data received from the controller 460. Within this patent, the term "data" is intended to include digital data, commands, instructions, digital signals, analog signals, optical signals and any other data that may be used to communicate the value of a parameter such as interocular distance or convergence angle.

The motion platform 430 may include a $\Theta_{IC}$ mechanism 435 to adjust an inter-camera convergence angle between the left and right cameras 410L, 410R and the 2D camera 420 by pivoting either the 3D cameras 410L, 410R or the 2D camera 420. The $\Theta_{IC}$ mechanism 435 may include a movable platform or stage coupled to a motor or other actuator. The $\Theta_{IC}$ mechanism 435 may be adapted to set the inter-camera convergence angle in response to data received from the controller 460.

The 3D camera 450 may include a focus mechanism 436 to synchronously adjust and set the focus distance of the lenses 412L, 412R. The focus mechanism 436 may include a mechanical, electronic, electrical, or electro-mechanical linkage between the lenses 412L, 412R to simultaneously adjust the focus distance of both lenses to the same value. The focus mechanism 436 may include a motor or other actuator adapted to set the focus distance in response to data received from the controller 460. The focus mechanism 436 may be manually controlled by an operator such as a cameraman or focus puller. When manually controlled, the focus mechanism 436 may include an encoder, potentiometer, or other sensor to provide data indicating the focus distance to the controller 460. The focus mechanism 436 may be adapted to operate under manual control and/or in response to data received from the controller 460.

The 3D camera 450 may include a zoom mechanism 438 to synchronously adjust and set the focal length of the lenses 412L, 412R. The zoom mechanism 438 may include a mechanical, electronic, electrical, or electro-mechanical linkage between the lenses 412L, 412R to simultaneously adjust the focal length of both lenses to the same value. The zoom mechanism 438 may include a motor or other actuator adapted to set the focal length in response to data received from the controller 460. The zoom mechanism 438 may include independent motors or other actuators adapted to set the focal length of the left lens 412L and the right lens 412R in response to data received from the controller 460. The zoom mechanism 438 may be manually controlled by an operator such as a cameraman or assistant cameraman. When manually controlled, the zoom mechanism 438 may include an encoder, potentiometer, or other sensor to provide data indicating the focal length to the controller 460. The zoom mechanism 458 may be adapted to operate either under manual control or in response to data received from the controller 460.

The controller 460 may be coupled to an operator interface 462. The operator interface 462 may be independent of the 2D camera 420 and the 3D camera 450, or may be partially or wholly incorporated into one or both of the 2D camera 420 and the 3D camera 450. For example, the focus mechanism 426 of the 2D camera 420 may be manually controlled by one or more operators such as a cameraman and/or an assistant cameraman to set a desired common focus distance. In this case, the focus mechanism 426 may provide data to the controller 460 indicating the manually-set common focus distance. The controller 460 may then provide data to the focus mechanism 436 of the 3D 450 to automatically set the focus distance of the lenses 412L, 412R to the common focus distance. Conversely, an operator may adjust the focus mechanism 436 of the 3D camera 450 to set the common focus distance and the controller 460 may control the focus mechanism 426 to set the focus distance of the lens 424 to the common focus distance. In either case, the controller 460 may also provide data to the $\Theta_{IC}$ mechanism 435 to automatically adjust the inter-camera convergence angle to set an inter-camera convergence distance equal to the common focus distance. The controller 460 may also send data to the $\Theta_S$ mechanism 454 to automatically adjust the stereo convergence angle to set a stereo convergence distance based on the common focus distance. When the operator interface 462 is independent of either the 2D camera 420 and the 3D camera 450, the controller may control both the focus mechanism 426 and the focus mechanism 436 to set the focus distance of the lenses of both the 2D camera 420 and the 3D camera 450 to a common focus distance entered via the operator interface 462.

The operator interface 462 also may be used to control the focal lengths of the lenses in the 2D camera 420 and the 3D camera 450. For example, the zoom mechanism 428 of the 2D camera 420 may be manually controlled by one or more operators such as a cameraman and/or an assistant cameraman to set a desired focal length. In this case, the zoom mechanism 428 may provide data to the controller 460 indicating the manually-set focal length of the lens 424. The controller 460 may then provide data to the focus mechanism 438 of the 3D camera 450 to automatically set the focal length of the lenses 412L, 412R. The focal length of the lenses 412L, 412R may be set to be proportional to the focal length of the lens 424. Conversely, an operator may adjust the zoom mechanism 438 of the 3D camera 450 to set focal length and the controller 460 may control the zoom mechanism 428 to set the focus length of the lens 424 proportionally. When the operator interface 462 is independent of either the 2D camera 420 and the 3D camera 450, the controller may control both the zoom mechanism 428 and the zoom mechanism 438 to set the focal lengths of the lenses of both the 2D camera 420 and the 3D camera 450 in response to an value entered via the operator interface 462.

Figure 5:
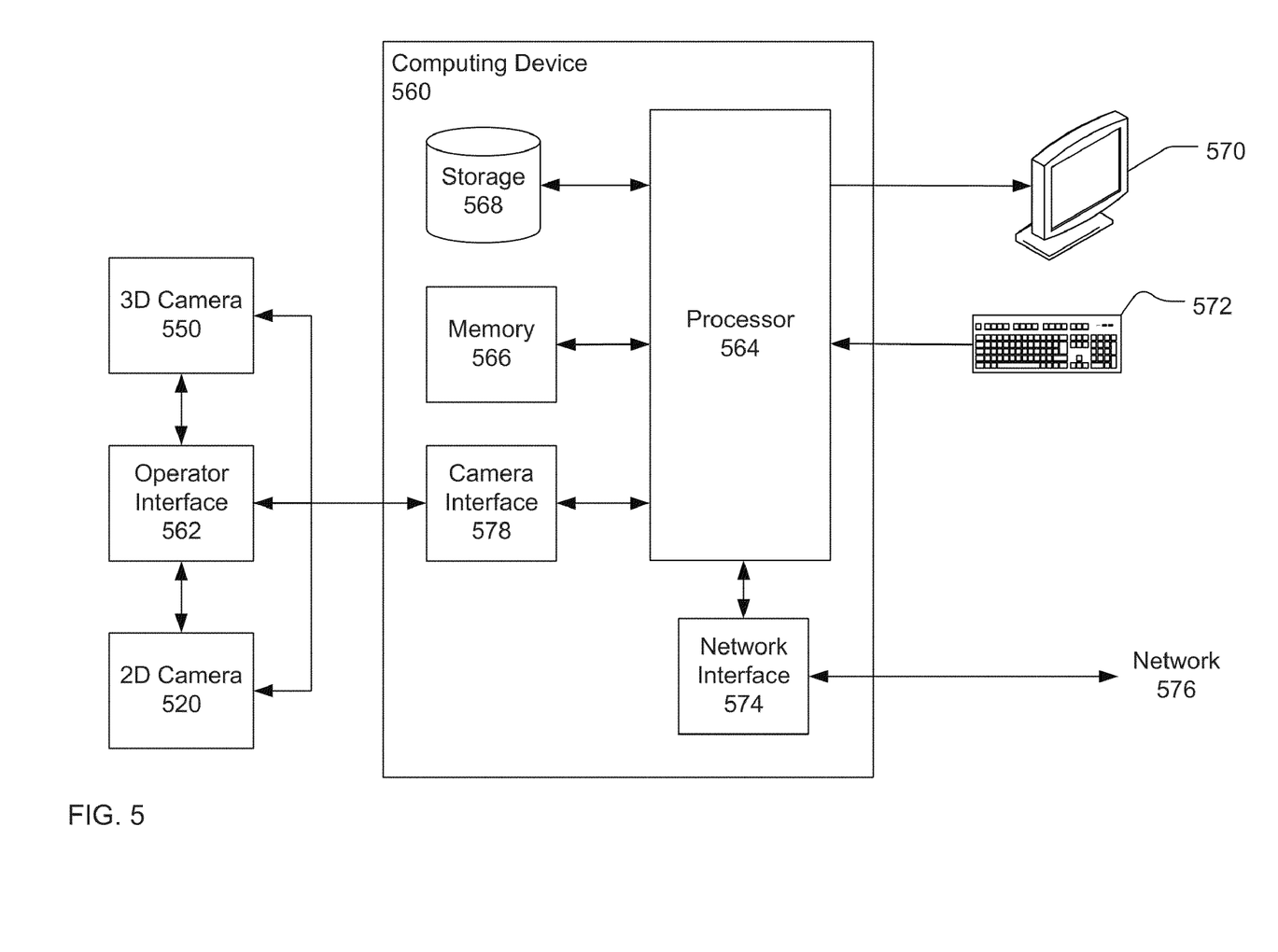
FIG. 5 is a block diagram of a computing device.

FIG. 5 is a block diagram of a computing device 560 that may be suitable for the controller 460. As used herein, a computing device refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. The computing device 560 may include hardware, firmware, and/or software adapted to perform the processes subsequently described herein. The computing device may include a processor 564 coupled to a memory 566 and a storage device 568.

The storage device 568 may store instructions which, when executed by the computing device 560, cause the computing device to provide the features and functionality of the controller 460. As used herein, a storage device is a device that allows for reading from and/or writing to a storage medium. Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media.

The computing device 560 may include or interface with a display device 570 and one or more input devices such a keyboard 572. The computing device 560 may also include a network interface unit 574 to interface with one or more networks 576. The network interface unit 574 may interface with the network 576 via a wired or wireless connection. The network 576 may be the Internet or any other private or public network.

The computing device 560 may also include a camera interface unit 578 to interface with a 2D camera 520, a 3D camera 550, and/or a camera operator interface 562. The camera interface unit 578 may include a combination of circuits, firmware, and software to interface with the 2D camera 520, the 3D camera 550, and/or the camera operator interface 562. The camera interface unit 578 may be coupled to the 2D camera 520, the 3D camera 550, and/or the camera operator interface 562 via a network which may be a local area network, via one or more buses such as a USB bus, a PCI bus, a PCI Express bus, or other parallel or serial data bus, or via one or more direct wired or wireless connections. The camera interface unit 578 may be coupled to the 2D camera 520, the 3D camera 550, and/or the camera operator interface 562 via a combination of one or more of direct connections, network connections, and bus connections.

The processes, functionality and features of the computing device 560 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 560 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 564 and others by other devices.

Description of Processes

Figure 6:
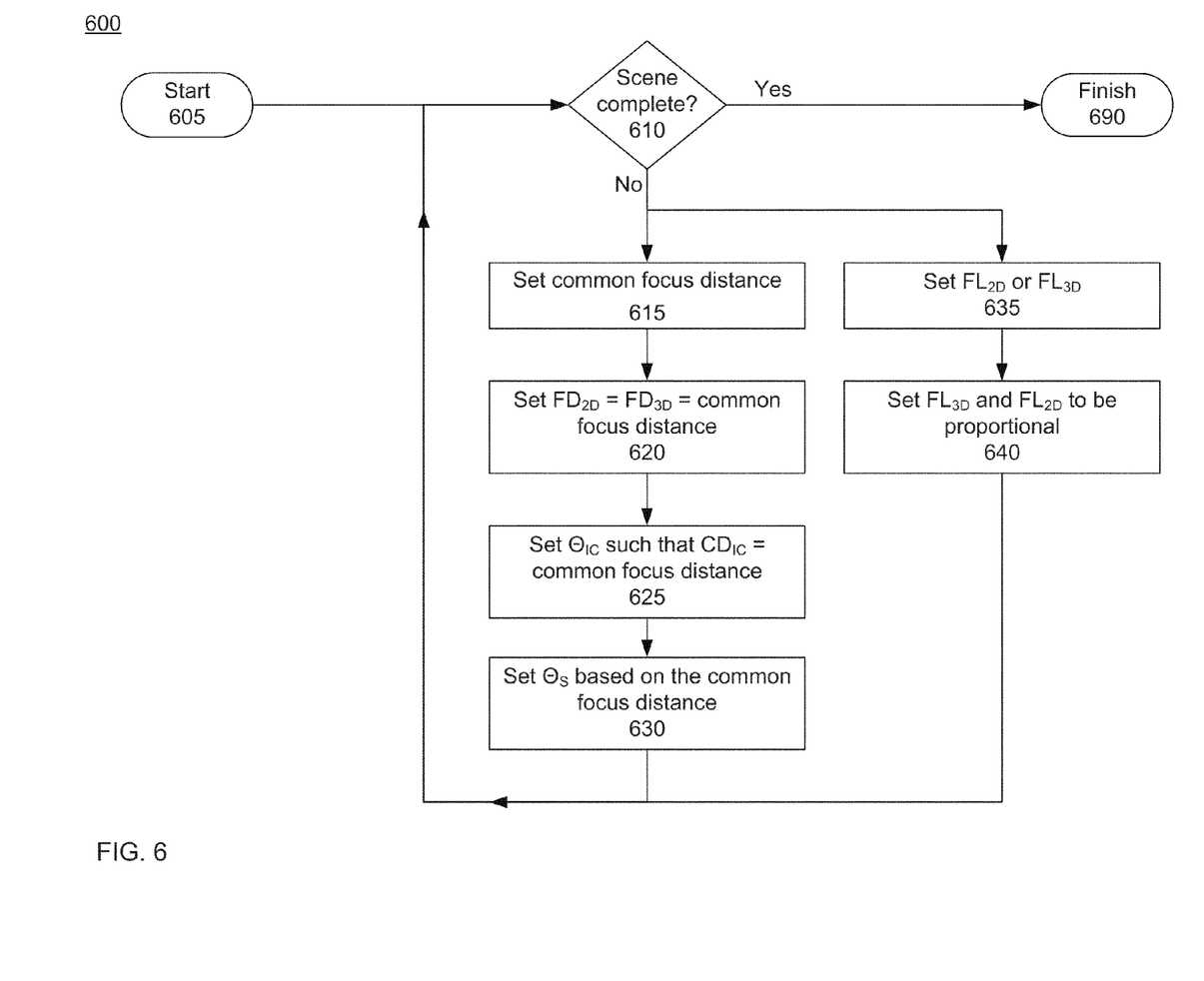
FIG. 6 is a flow chart of a process for operating an integrated 2D/3D camera.

FIG. 6 is a flow chart of an exemplary process 600 for simultaneously recording 2D and 3D images using an integrated 2D/3D camera including of a 2D camera affixed to a 3D camera, such as the integrated 2D/3D camera 200 or 400. Specifically, FIG. 6 is a flow chart of a process for recording a scene, with the assumption that an interocular distance within the 3D camera is predetermined and constant during the recording of the scene. The flow chart has a start 605 and a finish at 690 when the recording of the scene is complete. The process 600 may be repeated for each of a large plurality of scenes that may constitute, for example, a motion picture or television program. The process 600 is continuous in nature and the actions 610-640 within the process may be performed continuously and in near-real time during the recording of each scene.

Within this patent, the phrase "near-real time" means in real time except for processing delays that are very short compared with temporal events in the scene being recorded.

At 615, an operator, such as a cameraman or assistant cameraman, may enter a common focus distance, which may be the distance from the integrated 2D/3D camera to a primary object in the scene being recorded. The focus distance may be entered by directly adjusting a lens of either the 2D camera or the 3D camera, or via an operator interface independent of the camera lenses.

At 620 the focus distance of the 2D camera $FD_{2D}$ and the focus distance of the 3D camera $FD_{3D}$ may be set to the common focus distance entered by the operator at 615. When the operator entered the common focus distance at 615 by adjusting a lens on one of the 2D and 3D cameras, the lens or lenses of the other camera may be set automatically to the common focus distance. When the operator entered the common focus distance at 615 via an operator interface independent from the lenses, the lenses of both the 2D camera and the 3D camera may be set automatically at 620.

At 625, an inter-camera convergence angle $\Theta_{IC}$ may be set such that an inter-camera convergence distance $CD_{IC}$ is equal to the common focus distance set at 615. The inter-camera convergence angle $\Theta_{IC}$ may be set by tilting or rotating one or both of the 2D camera and the 3D camera.

At 630, a stereo convergence angle $\Theta_S$ may be set based on the common focus distance set at 615. The stereo convergence angle $\Theta_S$ may be set such that the stereo convergence distance $CD_S$ is equal to the common focus distance set at 615, is proportional to the common focus distance, is offset from the common focus distance, or is otherwise determined from the common focus distance. The stereo convergence angle $\Theta_S$ may be set by rotating one or both of left and right cameras within the 3D camera.

At 635, an operator, which may be the cameraman or the assistant cameraman or another operator, may enter a focal length for the lens of the 2D camera $FL_{2D}$ or a focal length for the lenses of the 3D camera $FL_{3D}$. The focal length may be entered by directly adjusting a lens of either the 2D camera or the 3D camera, or via an operator interface independent of the camera lenses.

At 640 the focal length of the 2D camera $FL_{2D}$ and the focal length of the 3D camera $FL_{3D}$ may be set to be proportional. When the operator entered the focal length $FL_{2D}$ by adjusting the lens of the 2D camera, the focal length $FL_{3D}$ of the lenses of the 3D camera may be set automatically to be proportional $FL_{2D}$. When the operator entered the focal length $FL_{3D}$ by adjusting a lens of the 3D camera, the focal length $FL_{2D}$ of the lens of the 2D camera may be set automatically to be proportional $FL_{3D}$. When the operator entered a focal length at 635 via an operator interface independent from the lenses, the lenses of both the 2D camera and the 3D camera may be adjusted automatically at 640.

At 610, a determination may be made if the recording of the scene is complete, in which case the process 600 may end at 690. When a determination is made at 610 that the recording will continue, the actions at 615-640 may be repeated continuously and in near-real time until the recording is completed.

Figure 7:
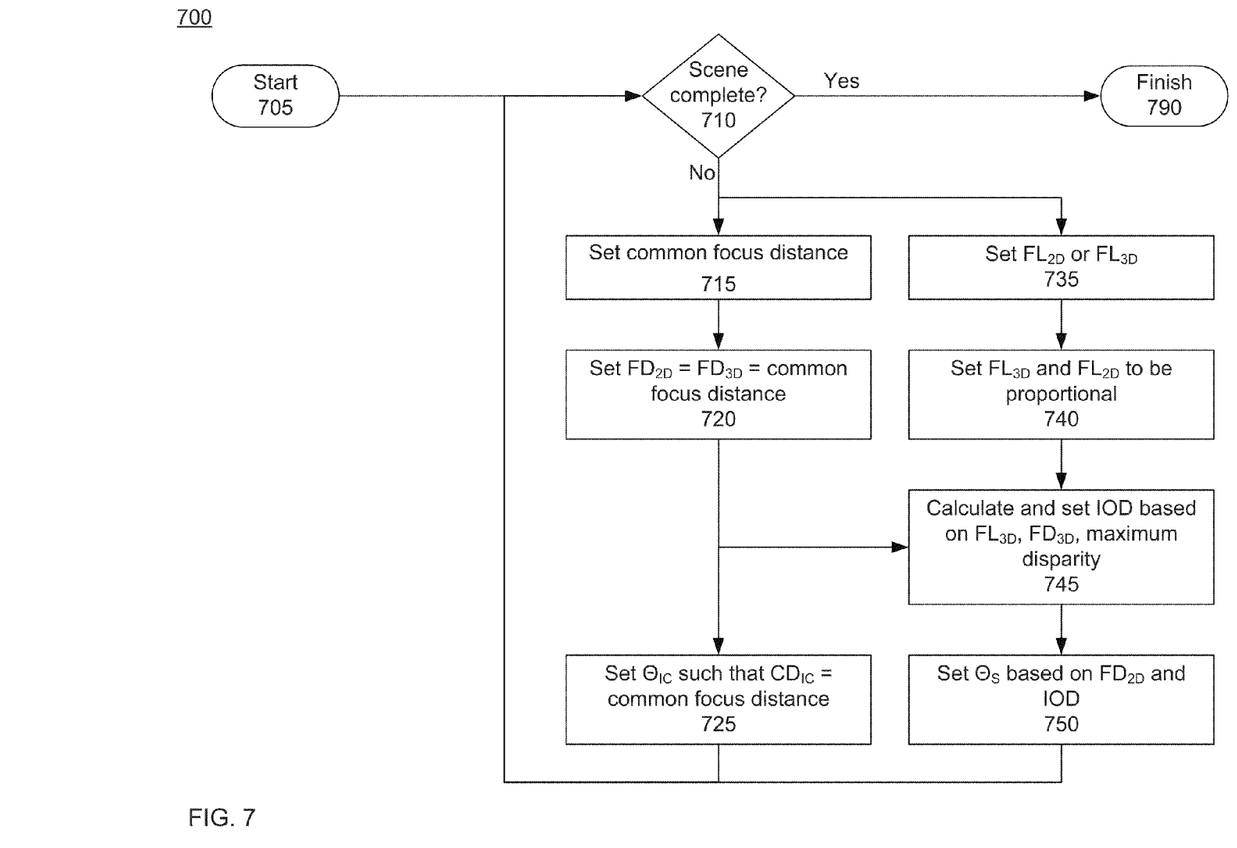
FIG. 7 is a flow chart of a process for operating an integrated 2D/3D camera.

FIG. 7 is a flow chart of another exemplary process 700 for simultaneously recording 2D and 3D images using an integrated 2D/3D camera comprised of a 2D camera affixed to a 3D camera. Specifically, FIG. 7 is a flow chart of a process for recording a scene, where an interocular distance within the 3D camera may be adjusted in near-real time during the recording of the scene. The actions 705-740 and 790 are essentially the same as the counterpart actions in FIG. 6 and will not be described again.

At 745, after the focus distance $FD_{3D}$ and the focal length $FL_{3D}$ of the lenses in the 3D camera have been determined, the interocular distance IOD may be calculated and set. The IOD may be calculated based on $FD_{3D}$, $FL_{3D}$ and a predetermined maximum disparity as described in copending application Ser. No. 12/209,316, entitled Stereo Camera with Automatic Control of Interocular Distance, which is incorporated herein by reference. The IOD may be set by moving one or both of the left and right cameras within the 3D camera.

At 750, a stereo convergence angle $\Theta_S$ may be set based on the common focus distance set at 615 and the IOD calculated and set at 745. The stereo convergence angle $\Theta_S$ may be set such that the stereo convergence distance $CD_S$ is equal to the common focus distance set at 615, is proportional to the common focus distance, is offset from the common focus distance, or is otherwise determined from the common focus distance. The stereo convergence angle $\Theta_S$ may be set by rotating one or both of left and right cameras within the 3D camera.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

The invention claimed is:

1. An integrated 2D/3D camera system, comprising:
   a 2D camera including a first lens, the first lens adjustable to set a 2D focus distance;

a 3D camera affixed to the 2D camera, the 3D camera comprising a left camera and a right camera including respective left and right lenses, the left and right lenses synchronously adjustable to set a 3D focus distance; and a focus mechanism effective to automatically set the 2D focus distance and the 3D focus distance to be essentially equal by one of adjusting the first lens based on the 3D focus distance and synchronously adjusting the left and right lenses based on the 2D focus distance.

2. The integrated 2D/3D camera system of claim 1, wherein the 2D camera and the 3D camera are offset by an inter-camera distance, the system further comprising:

an inter-camera convergence mechanism to automatically set an inter-camera convergence distance essentially equal to the 2D focus distance and the 3D focus distance.

3. The integrated 2D/3D camera system of claim 2, further comprising:

a stereo convergence mechanism to automatically set a stereo convergence distance based on the 2D focus distance and the 3D focus distance.

4. The integrated 2D/3D camera system of claim 3, further comprising:

a controller coupled to the focus mechanism, the inter-camera convergence mechanism, and the stereo convergence mechanism.

5. The integrated 2D/3D camera system of claim 4, wherein:

2D focus distance is set by an operator adjusting the first lens, and the controller receives focus data indicative of the 2D distance from the 2D camera and controls the focus mechanism, the inter-camera convergence mechanism, and the stereo convergence mechanism in accordance with the focus data.

6. The integrated 2D/3D camera system of claim 4, wherein the first lens is further adjustable to set a 2D focal length and the left and right lenses are synchronously adjustable to set a 3D focal length, the integrated 2D/3D camera system further comprising:

a zoom mechanism effective to automatically cause the 2D focal length and the 3D focal length to be proportional.

7. The integrated 2D/3D camera system of claim 6, wherein:

the controller is coupled to the zoom mechanism, the 2D focal length is set by an operator adjusting the first lens, and the controller receives zoom data indicative of the 2D length from the 2D camera and automatically controls the zoom mechanism to set the 3D focal length in accordance with the zoom data.

8. The integrated 2D/3D camera system of claim 6, further comprising:

an interocular distance mechanism effective to automatically set an interocular distance within the 3D camera based on the focus distance and focal length of the left and right lenses and a predetermined maximum allowable disparity.

9. A method for operating an integrated 2D/3D camera, the method comprising:

automatically setting a 2D focus distance of a lens of a 2D camera and a 3D focus distance of left and right lenses of a 3D camera affixed to the 2D camera to be essentially equal by one of adjusting the lens of the 2D camera based on a focus distance of the 3D camera and synchronously adjusting the left and right lenses of the 3D camera based on a focus distance of the 2D camera.

10. The method for operating an integrated 2D/3D camera of claim 9, wherein the 2D camera and the 3D camera are offset by an inter-camera distance, the method further comprising:

automatically adjusting an inter-camera convergence angle to set an inter-camera convergence distance essentially equal to the 2D focus distance and the 3D focus distance.

11. The method for operating an integrated 2D/3D camera of claim 10, further comprising:

automatically adjusting a stereo convergence angle to set a stereo convergence distance based on the common focus distance.

12. The method for operating an integrated 2D/3D camera of claim 11, wherein:

setting the focus distance of the left and right lenses of the 3D camera, adjusting the inter-camera convergence angle, and adjusting the stereo convergence angle are performed automatically in response to an operator adjusting the focus distance of the lens of the 2D camera.

13. The method for operating an integrated 2D/3D camera of claim 9, further comprising:

automatically setting a focal length of the lens of the 2D camera and a focal length of the left and right lenses of the 3D camera to be proportional.

14. The method for operating an integrated 2D/3D camera of claim 13, wherein:

setting the focal length of the left and right lenses of the 3D camera is performed automatically in response to an operator setting the focal length of the lens of the 2D camera.

15. The method for operating an integrated 2D/3D camera of claim 14, further comprising:

automatically setting an interocular distance within the 3D camera automatically based on the focus distance and focal length of the left and right lenses and a predetermined maximum allowable disparity.

* * * * *